United States Patent [19]

Obermaier

[11] 4,180,208
[45] Dec. 25, 1979

[54] TEMPERATURE LIMITING SHOWER CONTROL VALVE

[75] Inventor: Frank E. Obermaier, Bartlett, Ill.

[73] Assignee: Eaton Corporation, Cleveland, Ohio

[21] Appl. No.: 939,520

[22] Filed: Sep. 5, 1978

Related U.S. Application Data

[63] Continuation of Ser. No. 778,634, Mar. 17, 1977, abandoned.

[51] Int. Cl.² ............................................. G05D 23/12
[52] U.S. Cl. ................................. 236/93 B; 236/99 R; 236/93 A; 236/100
[58] Field of Search ................. 236/93 A, 93 B, 99 R, 236/100; 137/219; 251/63.4, 11

[56] References Cited

U.S. PATENT DOCUMENTS

| | | |
|---|---|---|
| 2,396,138 | 3/1946 | Vernet ............................ 236/93 A X |
| 2,775,381 | 6/1957 | Eskin .................................. 236/93 A |
| 2,938,533 | 5/1960 | Jensen et al. ........................ 137/219 |
| 3,263,926 | 8/1966 | Couffer et al. ...................... 236/93 B |
| 3,490,692 | 1/1970 | Genbauffe ......................... 236/93 R |

Primary Examiner—William F. O'Dea
Assistant Examiner—William E. Tapolcai, Jr
Attorney, Agent, or Firm—R. J. McCloskey; R. A. Johnston; E. Crist

[57] ABSTRACT

A valve for limiting the temperature of water flowing to a shower head, including a poppet valve member moveable into sealing engagement with a seat in response to the operation of an expansible temperature sensing member. Resilient means for accommodating overtravel of the sensing member, baffle means for directing water to the sensing member, means for effecting self centering of the poppet member and sealing means for isolating a moveable actuating portion of the sensing member are provided.

5 Claims, 2 Drawing Figures ns through
TEMPERATURE LIMITING SHOWER CONTROL VALVE This is a continuation of application Ser. No. 778,634, filed Mar. 17, 1977, now abandoned.

BACKGROUND OF THE INVENTION

1. Field of the Invention

The present invention relates generally to automatic temperature controlled mechanisms having a thermostat located in the fluid whose temperature is controlled and more specifically to both shower temperature control valves for protecting bathers from scalding during use.

2. Description of the Prior Art

Temperature responsive control valves for limiting water temperatures in shower baths are known in the prior art. An example of such valves may be seen in U.S. Pat. No. 3,263,926 to Algino and Couffer, which is assigned to the assignee of the present invention. Certain disadvantages have been noted, however, in the construction and use of the prior art valves. Chief among these has been the tendency to damage the thermostatic element used in such valves by contained exposure to fluid temperatures at least as high as that required to close the valve. The damage occurs because of the continued expansion of the termostatic element after it has moved the valve to a mechanically closed position.

Another disadvantage has been that thermostatic elements have occasionally become inoperative due to contamination or corrosion of the moving parts thereof by the water passing through the valve.

Still another disadvantage has been that operation of such valves in response to changes in water temperature has been slower than is desirable.

Yet another disadvantage noted in some valves has been the difficulty maintaining alignment of the moving parts of the valve with their cooperating stationary sealing surfaces.

SUMMARY OF THE INVENTION

Responsive to the disadvantages noted in the prior art it is an object of the present invention to provide a temperature limiting shower control valve having a thermostatic element protected from mechanical failure caused by continued exposure to temperature in excess of that required to close the valve.

It is another object to provide a temperature limiting shower control valve which is protected from failures caused by contaminations or corrosion of moving parts by the water passing through the valve.

It is still another object to provide a valve that is quickly responsive to changes in water temperature.

It is yet another object to provide a valve effective to prevent misalignment of moving parts relative to stationary sealing surfaces.

According to one feature of the present invention, biasing means are provided which operatively engage a thermostatic element of the invention temperature limiting shower control valve and permit overtravel thereof after the thermostatic element has operated to move a valve member into sealing engagement with a seat member.

According to another feature, a moveable actuating portion of the thermostatic element of the invention valve is fluidly isolated from the water passing through the valve to prevent contamination and corrosion.

According to still another feature, baffle means are included in the invention valve adjacent a sensing portion of the thermostatic element to direct fluid from the inlet of the valve to the sensing portion to reduce the response time of the thermostatic element to changes in temperature.

According to yet another feature, self centering surfaces are provided to operatively engage both the thermostatic element and a moveable valve member of the invention valve.

BRIEF DESCRIPTION OF THE DRAWINGS

These and other objects and features will become clear by reference to the accompanying description and drawing in which like numbers refer to like parts throughout the views and in which.

DESCRIPTION OF THE PREFERRED EMBODIMENTS

Figure 1:
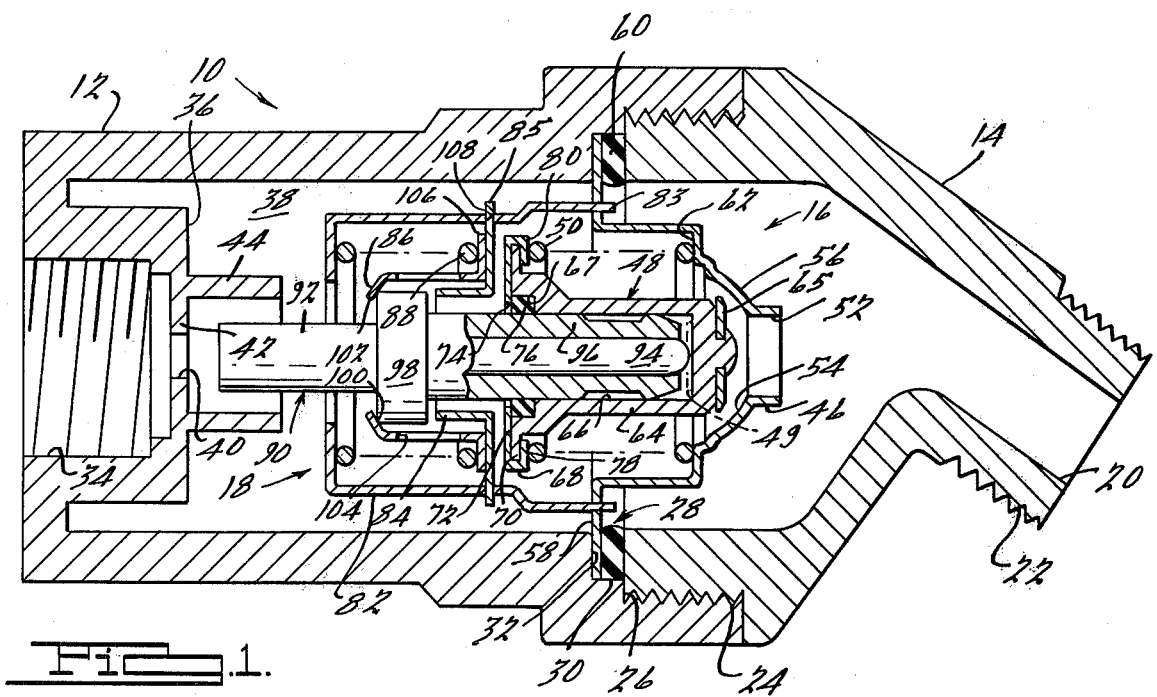
FIG. 1 is a cross-sectional view of a preferred embodiment of the invention valve.

Referring first to FIG. 1, a bath shower temperature limiting valve is indicated generally at 10. It includes an inlet housing 12, an outlet housing 14, a valve assembly 16, and a temperature sensing actuating assembly or thermostat 18.

The outlet housing 14 includes an outlet port 20 which is adapted to be connected to a shower spray head as at the externally threaded portion 22. It is threadedly engaged at 24 with the inlet housing 12, bottoming at a shoulder 26 to form an annular cavity 28 with a counterbore 30 terminating in a shoulder 32 in the inlet housing 12.

Inlet housing 12 includes a threaded inlet port 34 formed in an inward extending boss 36. The threaded port 34 may be connected to a source of water (not shown), and communication with an internal cavity 38 defined by the housing 12 is effected through an orifice 40 formed through the inner wall 42 of the boss 36. An inward extending annular flange or baffle member 44 is formed on the boss 36 adjacent the orifice 42 for reasons to be made clear below.

The valve assembly 16 includes generally a seat 46, a poppet assembly 48, and a return spring 50. The seat 46 is stamped, molded, or otherwise fabricated as a generally cup-shaped member having a centrally located discharge orifice 52 formed through it. An inner valve seating surface 54 is formed, preferrably as a spherical radius, in a converging nozzle section 56; and an outward extending annular flange portion 58 is provided which is received in the annular cavity 28 wherein a static seal member such as the "O" ring 60 is employed to prevent external leakage as well as leakage between the inlet and outlet housings 12, 14. An outward extending annular spring seating surface 62 is also formed in the seat member 46.

Poppet assembly 48 includes a body member 64 having an axially extending blind bore 66 and concentric counterbore 67 formed therein. A hardened flexible sealing element 65 is fixedly secured as by riveting to the end of the body member 64 proximate the seating surface 54, and a generally disc-shaped retaining member 68 is secured to an outward extending annular flange 70 proximate the other end of the body 64. The annular wall 72 of retaining member 68 has a bore 74 formed through it having a diameter slightly less than the counterbore 67 of body member 64. A sliding seal such as that depicted at 76 is thereby retained in the counterbore 67. An inturned flange portion 78 of the retaining member 68 defines a spring seat surface 80 against which one end of the spring 50 is grounded, the other end bearing against the surface 62 of seat member 46.

The thermostat assembly 18 is illustrated as including a bracket 82, a spring retainer 84, a power element retainer 86, an overtravel spring 88, and an expansible temperature sensing power element 90.

The power element 90 is of the solid fill type containing a microcrystalline wax or the like (not shown) within a temperature sensing portion 92. Fusion and expansion of the wax at a temperature at and above temperature of a predetermined critical valve (approximately 110° F. in a shower bath) effects extensible movement of an actuating member or power member 94 with respect to the generally cylindrical body 96 of the element 90. Since the body 96 is slidingly sealingly received in the bore 66 of the poppet body 64 this movement effects movement of the poppet as will be described below. An enlarged band portion 98 is disposed on the body 96 which is assembled in abutting engagement with a self centering surface 100 of element retainer 86, which surface is preferably but not necessarily formed as a spherical radius through stamping or other suitable process.

The element retainer 86 is a generally hat shaped structure and further includes an aperture 102 for permitting passage of the sensing portion 92 of element 90, side apertures 104 for permitting the passage of fluid, and an outward extending flange portion 106, which is assembled as shown in FIG. 1 in an abutting piloted relationship with the spring retainer 84 and providing a seat for the spring 88 thus enclosed between the element retainer 86 and the bracket 82. The spring retainer 84 is secured to the bracket 82, which is a flexible, webbed structure by opening the bracket 82 to permit insertion of a flanged portion 85, which may be formed as tabs through slots 108 formed through the bracket 82. The bracket 82 is then closed to the position shown in FIG. 1 and tabs 83 are inserted in slots 47 in seat 46 and staked or otherwise secured in place.

OPERATION OF THE PREFERRED EMBODIMENT

As is apparent from the drawing of FIG. 1, in assembling the invention valve 10, the assembled load of overtravel spring 88 exceeds that of preload spring 50. Final positioning of the poppet member 48 with respect to the seat 46 may be then effected at assembly by the use of the shims 49 indicated in phantom in the bore 66. For a known shower valve application the position established results in a spacing of 0.064 to 0.090 inches between the seal member 65 and the spherical seat portion 54 of the seat 46.

Upon connecting the inlet port 34 to a source of water fluid communication is effected with the outlet port 20, which may be connected to a known shower spray head (not shown). Water passes through the orifice 40 and is immediately directed adjacent the sensing portion 92 of the element 90 by the baffle flange 44 thereby providing for quick response to temperature change by the power element 90. It then passes through the inlet housing cavity 38, the bracket 82, and the element retainer 86, and around the poppet assembly 48 to exit through the seat orifice 52 to the outlet port 20.

As water temperature increases to a predetermined temperature (typically 110° F.), expansion of the wax in the element 90 displaces the power member 94 rightward as viewed in FIG. 1 with sufficient force to overcome the spring 50 until the sealing element 66 contacts the seat surface 54 to substantially prevent flow through the orifice 52. To permit removal of high temperature water from the valve assembly and thus resetting of the valve a leakage path such as a slot (not shown) in the seal member 65 may be provided to permit a low rate of flow when this contact is made. The provision of the preferably spherical seat surface 54 of seat 46 and the self centering surface 100 of element retainer 86 permits centering motion of the seal element 65 with respect to the seat 46. This centering motion additionally operates to make the valve assembly 16 self cleaning in that the movement of the hardened seal member 65 against the seat surface 54 tends to scrape mineral deposits off of the latter surface.

Upon the poppet assembly 48 reaching the sealing position described, further extension of the power member 94 operates to displace the element body 96 leftward as viewed in FIG. 1 against the force of the overtravel spring 88, thereby preventing damage to the element 90. When water temperature is reduced, the poppet assembly 48 is returned from its closed position by operation of the return spring 50.

The return force required of the spring 50 is minimized in the preferred embodiment by the hydraulic balance effected by the positioning of the sliding seal 76. Since the unpressurized area of the element body 96 under the seal is not substantially less than the area sealed by the seal element 65, little hydraulic load is added to the force necessary to return the power member 94 in opening the valve. This allows fast resetting of the valve with a relatively low return spring force.

DESCRIPTION OF THE FIG. 2 EMBODIMENT

Figure 2:
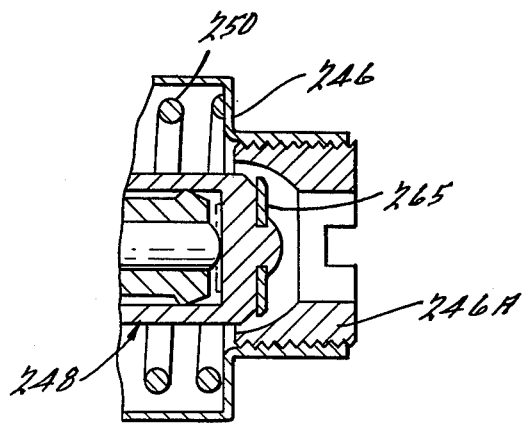
FIG. 2 is a partial cross-sectional view of an alternative embodiment of the invention valve.

As has been explained in the description of the preferred embodiment of FIG. 1, the poppet valve assembly is axially positioned with respect to the seat a fixed distance representtive of the expansion of the thermostat element brought about by the increase in water temperature to a predetermined value. In the alternate embodiment of FIG. 2 this axial positioning is effected by movement of an externally threaded adjustable seat member 246A which is received in an internally threaded seat member 346 which is otherwise identical to the seat 46 of the FIG. 1 embodiment. This alternative embodiment thus eliminates the need for the shims 49 installed in bore 66 of the FIG. 1 embodiment and permits adjustment of the travel (and thus the shut-off temperature) of the poppet assembly 248 without removal of the power element 290.

While the present invention temperature limiting valve assembly has been disclosed in only two embodiments, others are possible without departure from the scope of the appended claims.

What is claimed:

1. A valve assembly for limiting the temperature of fluid passing therethrough and adapted to be carried in a housing fluidly intermediate an inlet port and an outlet port thereof, the valve assembly comprising:
   (a) bracket means adapted to be secured to said housing, said bracket means including, (i) a valve seat means defining a first self centering surface,
(ii) retainer means defining a second self centering surface, said second self centering surface being substantially axially aligned with said first self centering surface;
said retainer means being movable with respect to said bracket means;
(b) poppet means disposed adjacent said valve seat, said poppet means having a valve surface thereon;
(c) temperature sensitive means mounted within said bracket means and having an actuator extending therefrom and connected to said poppet means and a reaction surface thereof seated against said second self centering surface, said temperature sensitive means being operative to move said poppet means in response to a predetermined fluid temperature value from an open position in which said valve surface is spaced from said valve seat for permitting flow therethrough to a closed position in which said valve surface of said poppet means contacts said first self centering surface of said valve seat for substantially blocking flow therethrough;
(d) first biasing means for biasing said poppet means toward said open position, said first biasing means urging said temperature sensitive means toward said second self centering surface; and
(e) said retainer means further including second biasing means for maintaining said second self centering surface stationary relative to said housing as said temperature sensitive means moves said poppet means between said open and closed positions, said second biasing means permitting further movement of said temperature sensitive means as fluid temperatures above said predetermined value are sensed.

2. A valve as defined in claim 1, wherein,
(a) said poppet means comprises a generally cup shaped member having an axially extending blind bore;
(b) said temperature sensitive member including a generally cylindrical body slidingly received in said bore and an actuating member carried within said body and movable with respect thereto to effect said valve movement; and
(c) sliding seal means disposed between said valve member and said body portion proximate the open end of said valve member bore.

3. A valve assembly as defined in claim 1, wherein said valve seat means includes adjustment means for varying the spacing of said poppet means from said valve seat in said open position.

4. A valve assembly as defined in claim 1, wherein said valve seat is formed by the outer peripheral surface of a disk shaped member carried on said cup shaped member for engaging said first self centering surface, whereby cleaning of said surface is effected by movement thereagainst.

5. A valve assembly for limiting the temperature of fluid passing therethrough, the valve assembly comprising:
(a) housing means defining an inlet and an outlet port;
(b) bracket means secured to said housing, said bracket means including,
(i) valve seat means defining a first annular self centering surface,
(ii) retainer means defining a second annular self centering surface, said first and second self centering surfaces being substantially axially aligned; said retainer means being movable with respect to said bracket means;
(c) poppet means disposed adjacent said valve seat means, said poppet means having a valve surface thereon;
(d) temperature sensitive means disposed within said bracket means and having an actuator movable in response to temperature changes connected to said poppet means and a reaction portion thereof seated against said second self centering surface, said temperature sensitive means being operative in response to experiencing a predetermined fluid temperature to move said poppet means from an open position in which said valve surface is spaced from said valve seat for permitting flow therethrough to a closed position in which said valve surface of said poppet means contacts said first self centering surface of said valve seat for blocking flow therethrough;
(e) first biasing means for biasing said poppet means toward said open position, said first biasing means urging said reaction portions of said temperature sensitive means toward said second self centering surface; and
(f) said retainer means further including second biasing means for maintaining said second self centering surface stationary relative to said housing as said temperature sensitive member moves said poppet means between said open and closed positions, said second biasing means permitting further movement of said temperature sensitive member as fluid temperatures above said predetermined value are sensed.

* * * * *